S. J. Seely.
Passenger Car.

No. 1,213.

Reissued Jul. 9, 1861.

Witnesses.
E. B. Richards
Chas. L. Dawes.

Inventor.
Saml J. Seely

UNITED STATES PATENT OFFICE.

SAMUEL J. SEELY, OF BROOKLYN, NEW YORK, ASSIGNOR TO CHARLES W. DURANT, OF SAME PLACE.

IMPROVED IRON RAILWAY-CARS.

Specification forming part of Letters Patent No. 28,041, dated April 24, 1860; Reissue No. 1,055, dated October 2, 1860; Reissue No. 1,213, dated July 9, 1861.

*To all whom it may concern:*

Be it known that I, SAMUEL J. SEELY, late of Buffalo, New York, but now of the city of Brooklyn, in the same State, have invented certain new and useful Improvements in the Construction of Railroad-Cars and other Vehicles; and I do hereby declare that the following is a full and exact description of the same, reference being had to the accompanying drawings and to the letters of reference marked thereon, in which—

Figure 3:
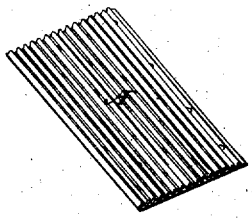
Figure 5:
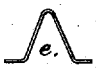
Figure 4:
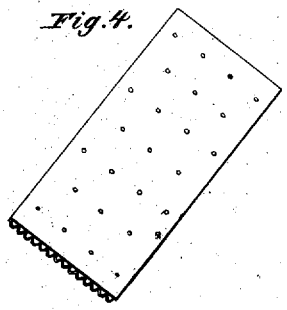
Figure 1:
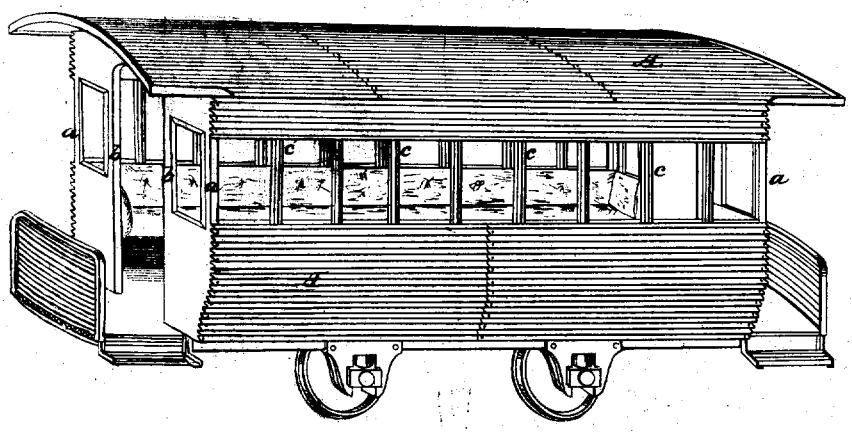
Figure 2:
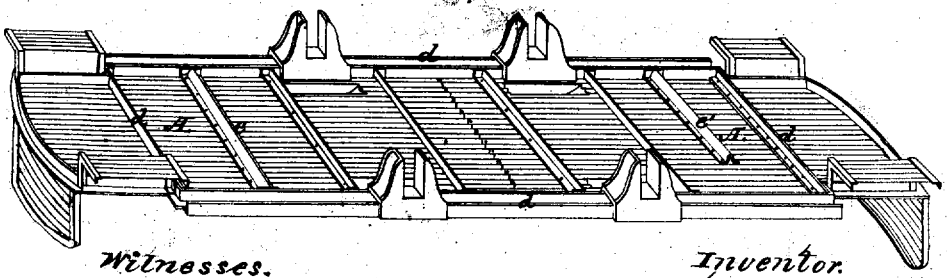

Figure 1 is a perspective view of a railroad-car embodying my improvement for a light or "horse" car. Fig. 2 is a similar view of the under side of the bottom of the car. Fig. 3 is a similar view of one of the plates detached, showing its corrugations. Fig. 4 is a similar view of the reversed side of Fig. 3, showing a flat plate secured to and upon the corrugations to form a flat surface when desired; and Fig. 5 is an end view of the "trough"-iron used to stay the bottom of the car.

My invention relates to the construction of the bodies of railroad-cars and other vehicles of corrugated metal plates of one or more series or thicknesses; and it consists, first, in arranging the single plate (when one plate or thickness is used) or the outer plate (when two or more series or thicknesses of plates are used) with the corrugations of the single or of the outer plate running longitudinally, for the reasons and to effect the purposes hereinafter described; second, in constructing the said bodies of the said corrugated metal plates, secured by and upon suitable angle-irons, and properly braced and strengthened by trough-irons, the design of my said invention being to secure a greater degree of strength to bear weight or to resist pressure than has ever before been attained with the same weight of material.

The body of the car or vehicle is made entirely of plates of iron which are bent or pressed up by proper dies or other suitable means into the corrugations shown in the drawings at A. By giving the plates this form a vastly increased strength is obtained to support weight, and also to withstand pressure or resistance from without, (as in the case of a collision or other accident,) over metal applied or used in flat plates. These corrugations may be larger or smaller, according to the size of the car or vehicle, the principal point to be regarded in their formation being that their bends shall not be so acute as to break or crack the metal to impair its natural strength.

The top, bottom, and sides of the car, as shown in Figs. 1 and 2, are formed of corrugated metal plates, which are riveted or otherwise properly secured together. The plates may be lapped over each other and then be riveted, or otherwise fastened together when the ends lap, or they may be made to abut together and the joints be covered by corrugated strips, placed on one or both sides of the plates, to be riveted to the plates. Where the plates join together at their edges they can be most securely fastened by letting them lap over each other the distance of one or two of the corrugations and then riveting the edges together.

Strong pieces of angle-iron *a a* are used to form the base and corners of the car, and to these pieces the corrugated plates are riveted when they come in contact. The door-casings *b b* are also made of metal, (and may be made of a continuous piece shaped and bent to form,) to which the corrugated plates are secured. Angle-irons *c c* extend up the sides of the car to form the casings of the windows, and, if desired, (to add increased strength,) some or all of them may be extended under and across the bottom of the car. To these irons the corrugated plates are also riveted and secured wherever it may be deemed necessary. Other pieces of angle-iron *d d* extend across the bottom of the car to form the frame-work and to dispense with the use of heavy timbers for such purpose. These are secured in place by rivets or other fastenings, as before described. Instead and in place of the angle-irons last named the trough-irons *e e*, Fig. 2, (shown detached in Fig. 5,) may be used to great advantage, their form giving increased strength to the floor of the car when desired without materially increasing its weight.

For light vehicles or for street or horse-cars, but a single thickness of iron corrugated longitudinally (to give all the strength required in both the vertical and horizontal direction of such vehicle or cars) would be required; but for "steam-cars," for freight or passengers, the body of the car should be formed of two or more series or thicknesses of corrugated plates, secured together with the corrugations on the outer plate running horizontally, as above named, and with the adjoining plate having its corrugations running vertically, (reversing the direction of the corrugations if more than two series or thicknesses of plates are used,) to give to both a greater degree of strength than could be otherwise attained with the same weight of material.

Where it is desirable to have the interior of the car or vehicle smooth, (to cover the corrugations,) thin plates of metal can be placed upon and be riveted to the corrugated plates, as shown in Figs. 3 and 4, and when desired, these flat plates may be struck up with figures or designs to render them ornamental.

The spaces between the plates last described or between the double corrugated plates named may be used to form ventilators to the cars in warm weather, or to convey heated air to them in cold weather.

In constructing cars and other vehicles in the manner herein described they are lighter and stronger than if made of wood in the usual manner, or of a combination of metal plates and wood, as has been before proposed.

I do not claim broadly the use of corrugated metal plates in the construction of railroad-cars and other vehicles; but What I do claim as my invention, and desire to secure by Letters Patent, is—

1. The application and use of corrugated metal plates to and in the construction of railroad-cars and other vehicles when the said plates are applied and used in a single series or thickness with their corrugations running horizontally, as herein set forth.

2. The application and use of corrugated metal plates to and for the purposes above named, when two or more series or thicknesses of plates are used, when the outer series of said plates has its corrugations running horizontally, as herein set forth.

3. The application of corrugated metal plates combined with and secured to and upon the angle-irons *a b c d*, for the construction of the bodies of railroad-cars and other vehicles, as herein set forth.

4. The application of the said corrugated metal plates and angle-irons combined with the trough-irons *e*, as set forth, and for the purpose described.

SAML. J. SEELY.

Witnesses:
FRANCIS S. LOW,
A. B. LITTLE.